Jan. 21, 1936.  C. ALBERS  2,028,428
FLASHLIGHT DEVICE
Filed March 27, 1933   3 Sheets-Sheet 1
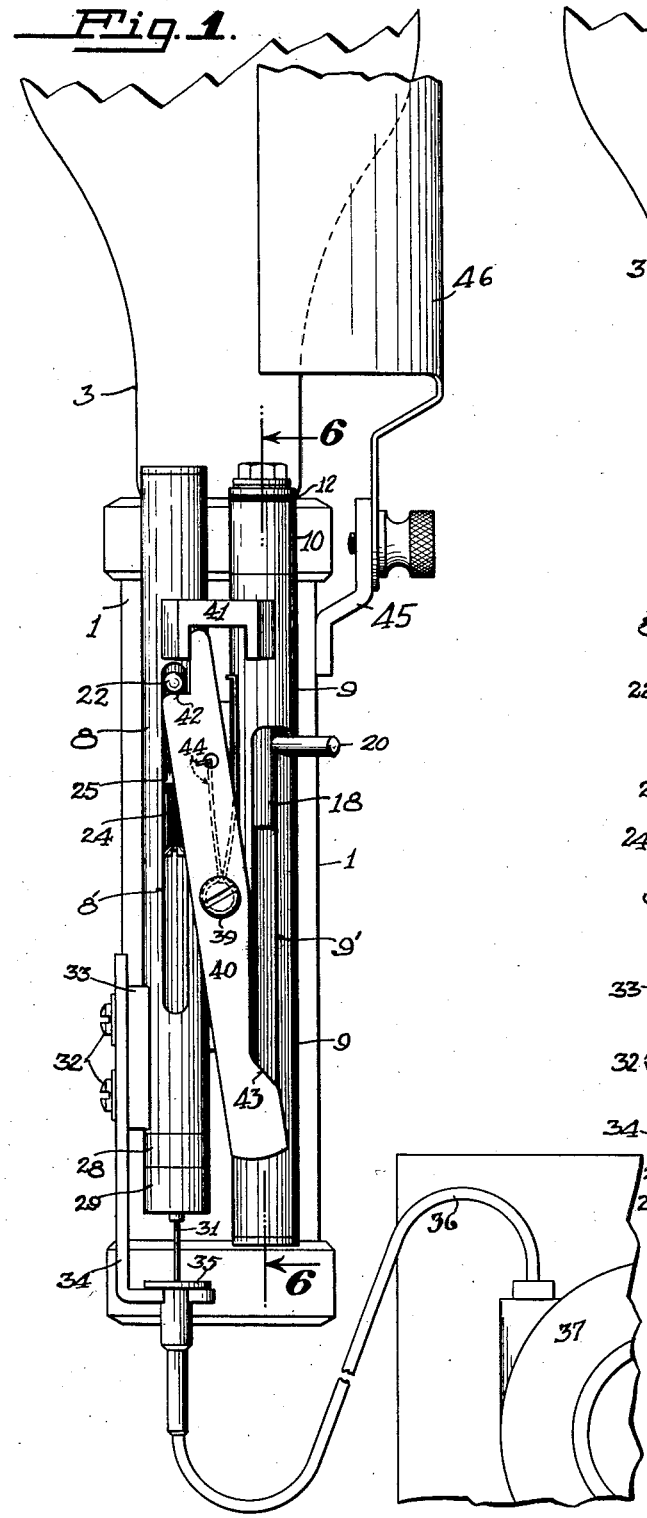
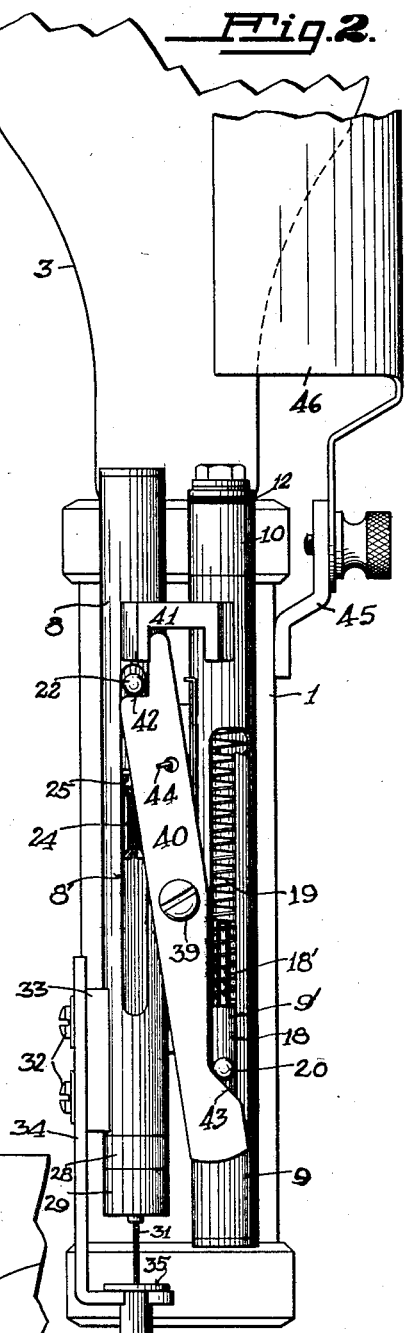
INVENTOR,
Clement Albers
BY J. E. Fralucco
ATTORNEY Jan. 21, 1936.  C. ALBERS  2,028,428
FLASHLIGHT DEVICE
Filed March 27, 1933  3 Sheets-Sheet 2
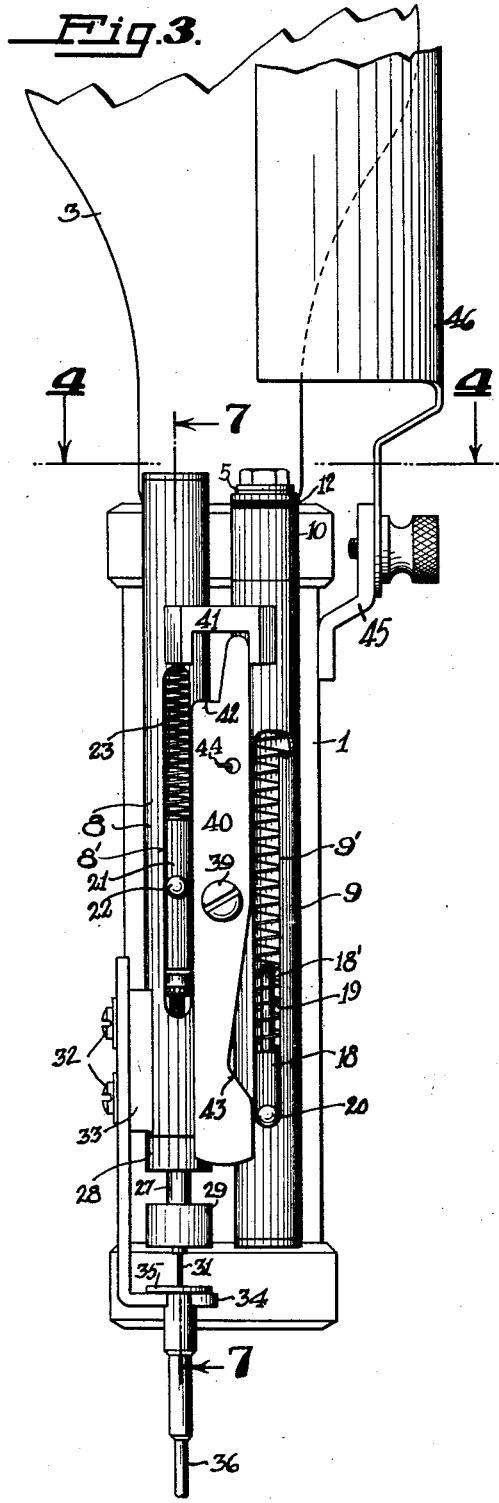
INVENTOR,
Clement Albers
BY
J. E. Trabucco
ATTORNEY Jan. 21, 1936.                C. ALBERS                2,028,428
                          FLASHLIGHT DEVICE
                    Filed March 27, 1933      3 Sheets-Sheet 3
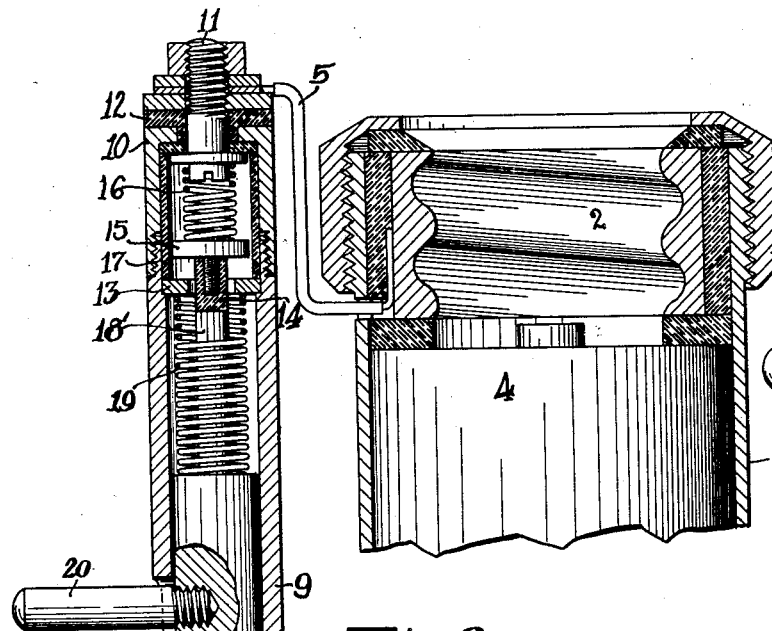
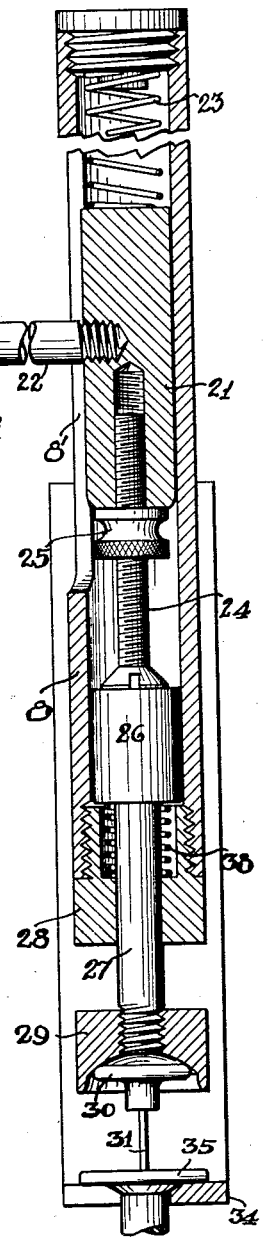
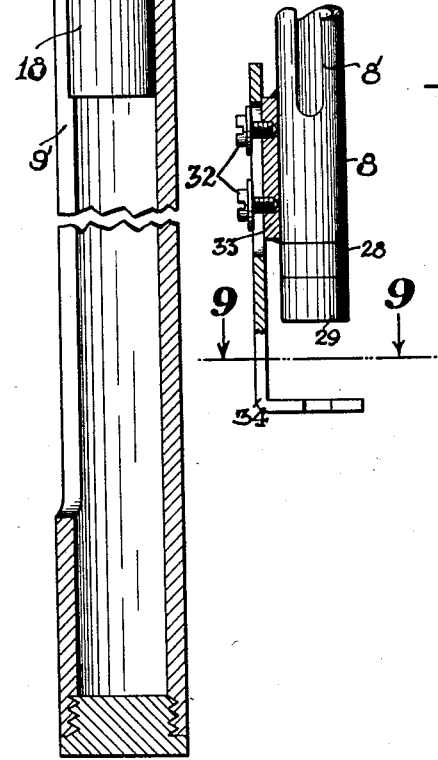
INVENTOR,
Clement Albers
BY
J. E. Trabucco
ATTORNEY Patented Jan. 21, 1936

2,028,428

UNITED STATES PATENT OFFICE 2,028,428

FLASHLIGHT DEVICE

Clement Albers, San Francisco, Calif.

Application March 27, 1933, Serial No. 662,984

3 Claims. (Cl. 67—29)

This invention relates to improved synchronizing apparatus for use in taking flashlight photographs.

An object of my invention is to provide improved apparatus for use in taking flashlight photographs, embodying novel means for synchronizing the opening of a camera shutter with the lighting of a photo-flash globe.

Another object of my invention is to provide a synchronizing apparatus for use in taking flashlight photographs, embodying novel means for closing an electrical circuit to a photo-flash globe or some other suitable light producing device, and for causing the simultaneous operation of mechanism employed to open a camera shutter, whereby a sensitized plate in the camera may be exposed at a time when the light produced by the flash globe is most brilliant.

A further object of my invention is to provide synchronizing apparatus for use in taking flashlight photographs, which eliminates the use of tripods or other camera supporting means, and permits the convenient holding of a camera in the hand while taking a flashlight photograph of a posed or moving object.

A still further object of my invention is to provide apparatus of the kind characterized, having adjustable features which insure the opening of a camera shutter at the particular time when the light from the photo-flash globe reaches its maximum brilliance.

Other objects more or less apparent will present themselves or will be pointed out in the description to follow.

In the accompanying drawings which illustrate the preferred embodiment of my invention:

Fig. 1 is a front elevation of apparatus of the kind characterized, showing the operating mechanism in a cocked position ready to be actuated;

Fig. 2 is a similar view showing a part of the operating mechanism in a position after it has been released but before it has reached the end of its stroke;

Fig. 3 is a similar view showing the operating mechanism in a position of rest after the strokes have been completed;

Fig. 4 is a sectional view taken on the line 4—4 of Fig. 3;

Fig. 5 is a side view of the apparatus;

Fig. 6 is a sectional view taken on the line 6—6 of Fig. 1;

Fig. 7 is a sectional view taken on the line 7—7 of Fig. 3;

Fig. 8 is a front view, partly in section, of the supporting bracket for the cable release member; and Fig. 9 is a sectional view taken on the line 9—9 of Fig. 8.

Although not exclusively so, the apparatus comprising my invention is preferably employed in connection with an artificial illuminating means commonly called a photo-flash globe. This type of globe contains a combustible compound which is ignited by the passing therethrough of an electrical current ordinarily supplied by suitable batteries. The light produced by the flash-globe is of very brief duration and the best photographic results are obtainable if the camera shutter opens at a time just after the beginning of the flash and before the end thereof, for it is at this interval that the maximum brilliance is reached. The adjustable feature of my invention permits the convenient adjustment of the shutter operating mechanism so the exposure takes place at a time when the light from the flash-globe is brightest.

Referring to the drawings, the numeral 1 designates a casing having a metal socket 2 at one end which is suitably insulated from the casing and is adapted to receive a photo-flash globe 3. The casing is adapted to hold one or more batteries 4 which supply an electrical current to the globe 3 when the circuit is completed. An insulated connection 5 extends through an opening provided in the casing and contacts with the socket 2. Secured to the side of the casing, as by solder, is a U-shaped member 6, between the two outwardly disposed legs of which is secured a bar 7 having a centrally disposed flange 7' extending therefrom. Secured to the bar 7 at opposite sides of the flange 7' and disposed in parallel relationship to the casing 1, are tubular members 8 and 9 which are provided, respectively, with longitudinally extending slots 8' and 9'.

The upper end of the tubular member 9 is provided with a detachable end cap 10 which has an opening in its top end through which a screw 11 extends. The connection 5 leading from the socket 2 in the casing connects with the screw 11 and suitable insulating material 12 located between the end cap, the connection and the screw, serves to prevent an electrical current supplied by the battery 4 from entering the said end cap. A flange at the lower end of the screw 11 and a nut at its upper end serve to maintain the screw, the insulating material 12, and the connection 5, in their proper relative positions on the end cap 10. Resting on a shoulder provided on the wall of the tubular member 9 beneath the screw 11, is a stationary metal ring 13 through which extends a stub shaft 14, made from rubber or other suitable insulating material. The upper end of the stub shaft 14 is provided with a metal disc 15 which is adapted to engage with the metal ring 13. Interposed between the disc 15 and the flange on the screw 11 is a coiled spring 16 which serves as an electrical connection between the screw and the disc, and also as means for forcing the said disc toward and in contact with the ring 13. The disc 15 is insulated from the wall of the end cap 10 by a layer of insulating material 17, thereby preventing an electrical current from passing from the said disc to end cap, except when contact is made by the disc with the ring 13.

Slidably mounted in the tubular member 9 is a plunger 18 having a centrally disposed projection 18' extending from its upper end, the said projection being adapted to engage with the stub shaft 14 to elevate the disc 15 above the ring 13 when the plunger is manipulated into a cocked position. Encircling the projection 18' with its ends bearing against the ring 13 and the upper end of the plunger 18, is a spiral spring 19 which exerts a downward force upon the plunger. Secured to the plunger is a manipulating handle 20 which extends outwardly through the slot 9' in the tubular member 9. The tubular member is cut away at the upper end of its slot to provide a seat for the location of the handle 20, the said handle being capable of being moved upwardly and into the seat when it is desired to cock the device preparatory to the operation thereof. When the handle 20 has been moved into a cocked position, as illustrated in Figs. 1 and 6, the spring 19 is contracted, and the disc 15 is held in an elevated position above the ring 13, thereby breaking the circuit to the globe 3. Upon freeing the handle 20 from its seat by pressing it into the slot 9', the spiral spring 19 causes the plunger 18 and its projection 18' to be moved in a downward direction, thereby allowing the disc 15 to be moved by the spring 16 into engagement with the ring 13. The contacting of the disc with the ring completes the electrical circuit to the globe 3, thereby causing the latter to be lighted with a brief intense flash.

Slidably mounted in the tubular member 8 is a plunger 21 having a handle 22 secured thereto, the said handle extending outwardly through the slot 8' in the tubular member. A spiral spring 23 located in the upper end of the tubular member exerts a downward force against the plunger 21. Screwed into the lower end of the plunger is an adjustable screw member 24 which is provided with a lock nut 25 that serves to maintain the screw in a certain position with reference to the plunger after it has been adjusted. Movably located in the lower end of the tubular member 8 is a cylindrical block 26 which is provided with a centrally disposed shaft 27 extending downwardly from its lower end through an opening provided in an end cap 28 screwed onto the lower end of the tubular member. Screwed onto the lower end of the shaft 27 is lug 29 which has its lower end cup-shaped to receive the head 30 of a cable release plunger 31. Adjustably secured by screws 32 to a block 33, which in turn is soldered to the tubular member 8, is an adjustable support 34, between the two forks at the end of which may be held a part 35 of the cable release mechanism. The cable release mechanism, including the head 30, the plunger 31, the part 35 and a connecting cable 36, is the ordinary kind now commonly employed to operate the shutter of a camera 37. The adjustable support 34 may be lengthened or shortened to accommodate cable release mechanisms which have different length plungers, and the cup-shaped lower end of the lug 29 permits the ready and proper adjustment therein of the head 30. Located between the block 26 and the end cap 28 is a spiral spring 38 which normally maintains the said block in an elevated position above the inwardly disposed upper end of the said cap. When the block 26 is held in its normally elevated position, the lug 29 through the connection of the shaft 27, is maintained in such a position that the cable release plunger 31, ordinarily held in an extended position by a spring, does not cause the operation of the camera shutter. When the spiral spring 23 forces the plunger 21 in a downward direction, the end of the screw 24 strikes against the block 26, thereby causing the latter to be moved downwardly in such a manner as to cause the operation of the cable release mechanism by the pressing of the lug 29 against head 30, thus causing the operation of the camera shutter so an exposure can be made. The downward movement of the block 26 is arrested by the latter's engagement with the upper end of the cap 28, this being done to prevent injury to the camera by not allowing the cable release plunger 31 to be depressed too far and with too sudden an impact. In order to permit the ready adjustment of the device so as to cause the timely operation of a camera shutter either sooner or later, dependent upon the time required to effect the maximum brilliance from the combustion of the materials in the globe 3, the screw 24 is provided with a conveniently manipulated head which is capable of being turned with a suitable implement such as a screw driver. By shortening the screw with reference to the lower end of the plunger 21, the camera shutter is opened later, and if the screw is lengthened or screwed outwardly from the said plunger, the shutter is opened sooner than otherwise. Thus if it takes varying lengths of time for different globes to reach their maximum brilliance after an electrical current is turned on, the screw 24 may be easily adjusted to insure the opening of a camera shutter at a time when the light from a globe is brightest.

Pivotally mounted on the flange 7' of the bar 7, by means of a screw 39, is a trigger release bar 40, the movement of the upper end of which is confined between the legs of an inverted U-shaped member 41. The upper end of the bar is cut away to provide a shoulder 42 upon which the handle 22 rests when the plunger 21 and its associated parts are in cocked positions. The lower end of the bar, at the edge thereof facing the tubular member 9, is cut away to provide an inclined shoulder 43, the said shoulder being in the path of the downwardly moving handle 20 when the said bar is in the positions illustrated in Figs. 1 and 2. A spring 44 engaging with the bar 40 and the tubular member 9 exerts a force against the upper end of the said bar in a direction toward the tubular member 8. When the handle 22 has been moved into a cocked position in which it rests upon the shoulder 42 of the bar 40, the spring 44 normally maintains the said bar in a position whereby it supports the said handle. When the handle 20 moves downwardly and strikes against the inclined shoulder 43, the bar is pivotally moved to a position where it no longer supports the handle 22 and its other affiliated parts, thereby enabling the spiral spring 23 to force the plunger 21 in a downward direction so the cable release mechanism may be actuated to operate the camera shutter.

A bracket 45 secured to the casing 1 serves to support a reflector 46 which is positioned behind the globe 3 so as to give better lighting effects during the taking of a flashlight photograph.

The device is properly cocked and ready for use when the handle 20 is lodged in its seat located adjacent the upper end of the slot 9' and the handle 22 rests on the shoulder 42 of the bar 40. Upon freeing the handle 20 from its seat by the pressure of a person's finger properly applied thereto, the operations of closing the circuit to the globe and of causing the opening of the camera shutter are entirely automatic. In taking a flashlight photograph all that need be done is to first properly direct the camera toward an object and then free the handle 20 from its seat.

From the foregoing description taken in connection with the accompanying drawings, it will be readily apparent to those skilled in the art that I have provided apparatus capable of automatically causing a photographic exposure to be made at a time when the most satisfactory lighting effect from a photo-flash globe is produced. It is to be understood that the disclosures herein made show but one form my invention may assume, and that various changes in regard to form and arrangement of parts may be made without departing from the spirit thereof. For this and other apparent reasons I desire that the appended claims define the limits my invention may assume rather than the exact disclosures herein made.

Having described my invention, what I claim is:

1. Apparatus of the kind described comprising a globe socket connected in an electrical circuit, a tubular member having switch means therein, the said switch means being connected in the circuit, a spring pressed plunger movably located in the tubular member, means interposed between the plunger and the switch means for holding the latter in an open position only when the plunger is in a cocked position with its associated spring contracted, a second tubular member, a spring pressed plunger movably mounted in the second tubular member, a shutter operating mechanism adapted to be actuated by the second mentioned plunger when the said plunger is actuated by its associated spring, trigger means adapted to releasably hold the second mentioned plunger in a cocked position with its spring compressed, and means carried by the first mentioned plunger for releasing the trigger means, whereby the switch means may be closed at the approximate time the shutter operating mechanism is actuated.

2. Apparatus of the kind described comprising a plurality of tubular members, a spring pressed plunger located in each tubular member, the said plungers being adapted to be held in cocked positions with their associated springs compressed, switch means in one of the tubular members, the said switch means being temporarily maintained in an open position by the particular plunger located in the same tubular member as the switch means when the said plunger is in a cocked position, means in another of the tubular members for actuating a device, the said means being adapted to be actuated by the particular plunger which is located in the same tubular member as the said device when the said plunger is released from a cocked position, trigger means for holding one of the plungers in a cocked position, and means carried by the other of the said plungers for releasing the trigger means, whereby the particular plunger supported by the trigger means is freed to be actuated by the spring associated therewith.

3. Apparatus of the kind described comprising a battery casing having a globe socket therein, a tubular member having switch means therein, the said switch means being electrically connected to the socket, a spring pressed plunger in the tubular member, the said plunger being adapted to temporarily hold the switch means in an open position when the plunger is in a cocked position with the spring contracted, a second tubular member, a spring pressed plunger located in the second tubular member, trigger means for holding the second mentioned plunger in a cocked position with its associated spring compressed, cable release operating means adapted to be actuated by the second mentioned plunger when the latter is actuated by its spring, and means carried by the first mentioned plunger for releasing the trigger means, whereby the second mentioned plunger may be actuated by its associated spring to operate the cable release operating means.

CLEMENT ALBERS.